Aug. 10, 1943.   F. D. JOESTING   2,326,226
THERMOSTAT
Filed Aug. 2, 1940   3 Sheets-Sheet 1

INVENTOR
Frederick D. Joesting
BY George H. Fisher
ATTORNEY

Aug. 10, 1943.   F. D. JOESTING   2,326,226
THERMOSTAT
Filed Aug. 2, 1940   3 Sheets-Sheet 2

INVENTOR
Frederick D. Joesting
BY George H. Fisher
ATTORNEY

Aug. 10, 1943.　　　F. D. JOESTING　　　2,326,226
THERMOSTAT
Filed Aug. 2, 1940　　　3 Sheets-Sheet 3

INVENTOR
Frederick D. Joesting
BY
George H. Fisher
ATTORNEY

Patented Aug. 10, 1943

2,326,226

UNITED STATES PATENT OFFICE 2,326,226

THERMOSTAT

Frederick D. Joesting, Chicago, Ill., assignor to Minneapolis-Honeywell Regulator Company, Minneapolis, Minn., a corporation of Delaware Application August 2, 1940, Serial No. 350,003

18 Claims. (Cl. 236—86)

The present invention relates to thermostats and more particularly to thermostats of the pneumatic type.

One of the objects of the invention is to provide a novel pneumatic thermostat of the non-bleed type.

Another object is to provide a pneumatic thermostat in which the operating differential may be readily adjusted.

Another object is to provide a pneumatic thermostat which can be adjusted to operate either direct acting or reverse acting by virtue of a novel lever arrangement.

A further object is to provide a novel valve arrangement for a pneumatic thermostat.

A further object is to provide a thermostat in which the control point may be varied by changing the air supply pressure.

Another object is to provide a day-night thermostat in which the amount of night set-down of the control point may be readily adjusted.

Another object is to provide a relay for a thermostat by means of which small changes in control air pressure will cause a change in the control point of the device.

A further object is to provide a pneumatic thermostat of the day-night type in which provision is made to place the instrument on its day setting when there is an air pressure call for night setting, provision also being made for recycling so that the next night shut-down will occur in the normal manner.

Another object is to provide a thermostat employing a novel temperature setting adjustment combined with a temperature setting indicator and a calibrating adjustment.

Another object is to provide a control point indicator adapted to cooperate with indicia on the instrument cover and also with indicia fixed to the instrument base on which the control point may be read when the cover is removed.

A further object is to provide a thermostat having an expansible pressure chamber operable on the thermostat mechanism to change the control point.

Further objects will be apparent from the following description, from the claims and from the drawings, in which:

Figure 2:
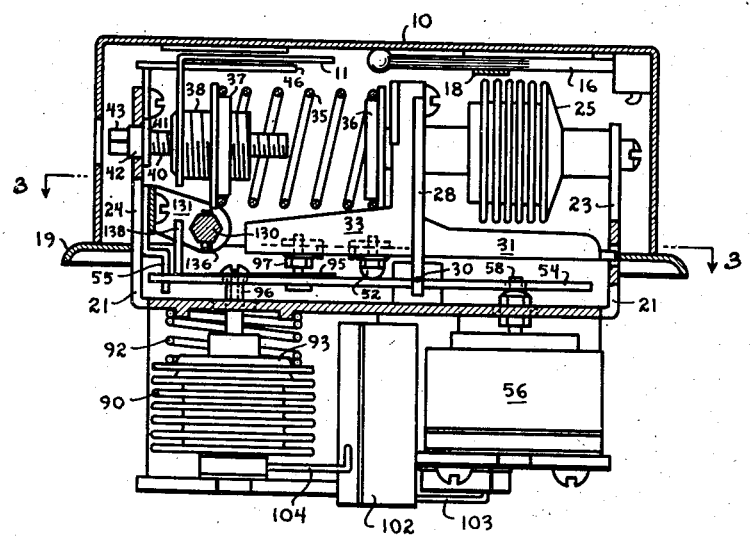
Figure 2 is a sectional view taken substantially on line 2—2 of Figure 1.
Figure 3:
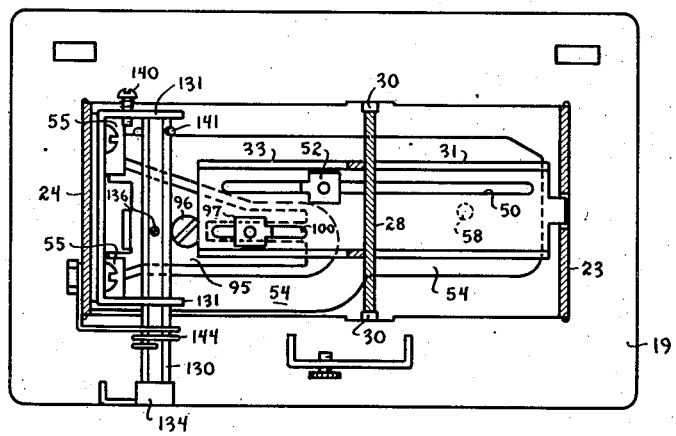
Figure 4:
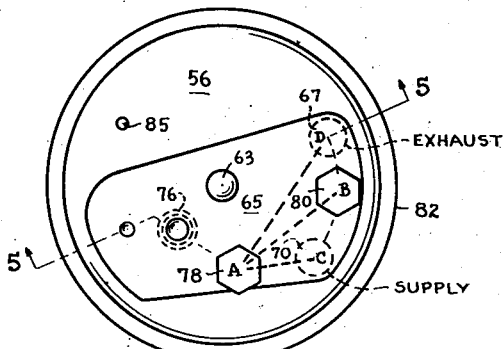
Figure 6:
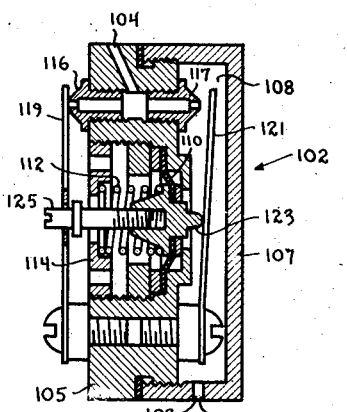
Figure 5:
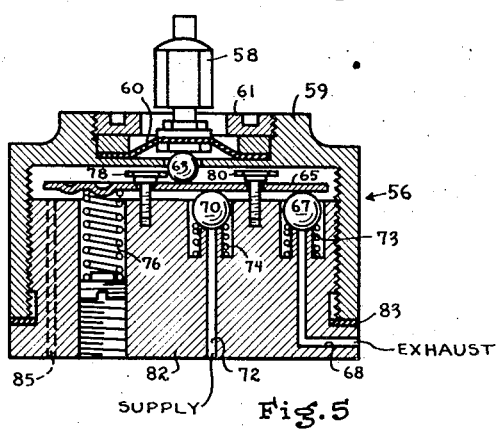
Figure 7:
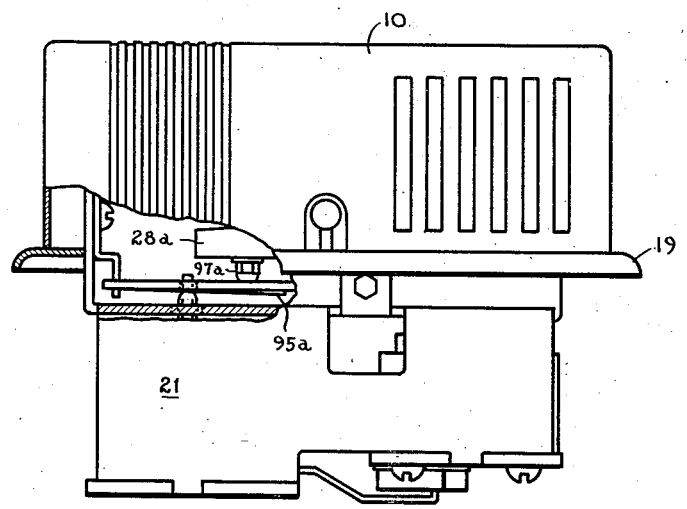
Figure 8:
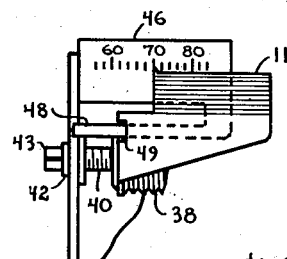

Figure 3 is a sectional view of the thermostat of Figure 2 and taken substantially on line 3—3 of Figure 2, Figure 4 shows the valve mechanism with the upper part removed, Figure 5 is a sectional view of the valve mechanism taken substantially on line 5—5 of Figure 4, Figure 6 is a sectional view of the day-night relay mechanism of the thermostat shown in Figure 2, Figure 7 shows a modified form of this thermostat, and Figure 8 shows the temperature setting mechanism of the thermostat.

The thermostat shown in Figures 1 through 6 and 8 is a pneumatic thermostat adapted to control the temperature in a space at one point during the day and at a lower temperature during the night. The changeover from day to night setting is accomplished by changing the pressure of the air which is supplied to the thermostat for control purposes.

Figure 1:
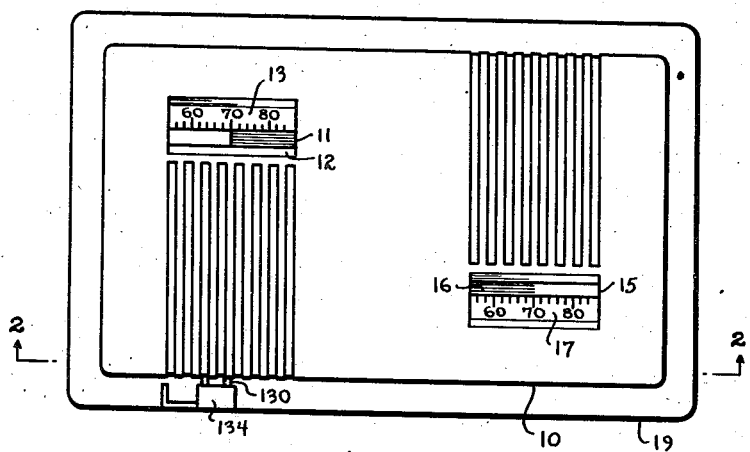
Figure 1 is a front view of a thermostat as it would appear mounted on a wall.

Figure 1 shows a front view of the thermostat with the cover in place. The cover 10 is provided with an opening 11 through which may be seen a temperature setting indicator 12 which will be more fully described hereinafter. Adjacent the opening 11 on the cover 10 are indicia 13 which cooperate with the indicator 12 to show the temperature setting of the device. A second opening 15 in the cover 10 is provided to afford a view of a glass thermometer 16 which is mounted on the underside of the cover. Suitable indicia 17 are provided on the cover 10 to cooperate with the thermometer 16. As seen in Figure 2 the thermometer 16 is frictionally secured beneath the cover 10 by means of clamp 18 in a manner to provide an adjustment of the thermometer tube with respect to the cover for purposes of calibration. The tube may be later fixed with respect to the cover by a fast drying cement such as ambroid. The cover 10 is seated on a wall plate 19 which is suitably secured to a main frame 21 which serves to secure the various parts of the thermostat in operative position. The frame 21 is provided with two parallel portions 23 and 24 which extend into the cover 10. The portion 23 of the frame 21 has secured thereto a volatile filled expansible bellows 25 which on expansion and contraction serves to rotate a main lever 28 about its pivots 30 in the frame 21. See Figure 3. The lever 28 is substantially "T-shaped" having a portion extending vertically as seen in Figure 2 to cooperate with the bellows 25 and a horizontally extending portion 31 to the right of the pivot 30 and a second horizontally extending portion 33 to the left of the pivot 30. Resisting counterclockwise movement of the lever 28 by the bellows 25 is a main spring 35 which bears against an abutment 36 provided on the upstanding portion of the lever 28. The left hand end of the spring 35 bears against a nut 37 which is adjustable on the exterior of a second nut 38. The nut 38 in turn is positioned on a temperature adjusting screw 40 which is provided with a head 42 having a flange 41 which abuts the portion 24 of the frame 21. The head 42 of screw 40 is provided with a squared portion 43 by means of which the screw 40 may be rotated with respect to the frame 21. Referring to Figure 8 it will be seen that the nut 38 has secured thereto the temperature setting indicator 11 heretofore referred to. Secured to the portion 24 of the frame 21 is an indicia plate 46 having indicia thereon corresponding to the indicia 13 on the cover 10. As will be seen from Figure 2 the indicator 11 lies between the indicia plate 46 which is mounted on the frame and the cover 10. With this structure it will be seen that the indicator 11 cooperates with both sets of indicia so that when the cover is in place the temperature setting may be read on the indicia 13 and when the cover is removed the temperature setting is visible on the indicia plate 46. The indicia plate 46 is provided with an extension 48 which extends through a slot 49 in the indicator 11 to prevent rotation of the nut 38 with respect to the frame 21. The shaded lines on the upper portion of the indicator 11 show that the indicator is colored some suitable color such as red to provide a readily visible indication of the temperature setting. The nut 37 is adjustable on the nut 38 in order to provide a calibration adjustment so that the tension of the spring 35 will be sufficient to balance the bellows when the space temperature is at the setting shown by the indicator 11.

The main lever 28 is provided with a slot 50 in its lower portion which extends substantially the entire length of both portions 31 and 33 as shown in Figure 3. Adjustably secured in this slot is an abutment 52 which is provided with suitable means for fastening it in any desired position along the slot. This abutment 52 is adapted to cooperate with a secondary lever 54 which is pivoted at its left hand extremity in a bracket 55 secured to the portion 24 of the frame 21 as seen in Figure 2. It will be seen that main lever 28 and secondary lever 54 are disposed in parallel relationship so that the abutment 52 may be moved from one point to another on lever 28 without changing the angular relationship between the main and secondary levers.

Mounted on the back part of the frame 21 is a valve mechanism 56 which is operated by the secondary lever 54 through an adjustable connection 58. The internal structure of this valve mechanism is shown in Figures 4 and 5. Briefly the function of the valve mechanism 56 is to supply a pressure to a branch air line which is dependent on the temperature of the temperature responsive bellows 25. Air is supplied under pressure to one port of the valve, this pressure being admitted in a chamber communicating with the branch line at such times as the thermostat calls for increased pressure. When a smaller pressure is required an exhaust port is opened to reduce the pressure in the chamber. As will be pointed out hereinafter, both valves are never open at the same time. One is always closed before the other is opened. In this way any suitable control mechanism such as a valve or damper may be suitably positioned. The true relation of the valve ports is shown in Figure 4 which is a view of the valve mechanism 56 with the upper portion 59 removed. In Figure 5 the lateral relation of the parts has been distorted somewhat in order to more clearly show the operation of this device. The adjustable connection 58 which connects with the secondary lever 54 is secured to a diaphragm 60 which is clamped in place in the upper portion 59 of the valve by means of a ring 61. A ball 63 serves to transmit the force supplied to the adjustable connection 58 to a valve operating member 65. The ball 63 acts merely as a pressure transmitting member and never interferes with the transmission of air pressure to the diaphragm 60. The member 65 is positioned to engage and actuate the ball valves 67 and 70 which control the exhaust port 68 and supply port 72, respectively. These valves are biased upwardly to open position, as seen in Figure 5, by springs 73 and 74 which therefore also bias member 65 upwardly. Spring 76 further biases member 65 upwardly and the under sides of the heads of screws 78 and 80 act to limit the upward movement of member 65. When no downward force is being exerted by ball 63 on member 65 the springs 76 and 73 act to pivot member 65 about the axis A—B (shown in dotted lines in Figure 4) and formed by the under side of the heads of screws 78 and 80 whereby the supply valve 70 is seated and the exhaust valve 67 is open. As the ball 63 presses downwardly, the member 65 is rotated about the axis A—C formed by the seated ball valve 70 and the under side of the head of screw 78. The spring 76 is so located as to produce a moment on member 65 about screw 78 and ball 63 which will hold the ball valve 70 in closed position against the action of spring 74 until the ball valve 67 is seated. This action closes valve 67 and also compresses biasing spring 76 somewhat. It will be noted that in this position of the member 65 both valves are closed and this position may therefore be referred to as the "normal" position. Further downward pressure by the ball 63 will cause member 65 to rotate about the axis A—D formed by the seated ball valve 67 and the under side of the head of screw 78. This rotative movement will permit biasing spring 74 to open the ball valve 70 controlling the supply port. Thus it will be seen that the valve 70 can only be opened after closure of the valve 67. A reduction in pressure by the ball 63 will obviously cause opposite movement of the member 65 to first close the supply valve 70 and then open the exhaust valve 67. The inlet and exhaust ports 72 and 68, the screws 78 and 80, and the spring 76 are all disposed in the lower part 82 of the valve 56. The upper and lower parts 59 and 82 of the valve 56 are suitably screw threaded together and a gasket 83 serves to render the space therebetween pressure tight. An opening 85 is drilled through the lower portion 82 of the valve 56 to the space separating the two portions to provide a communication to the branch line which leads to the pressure responsive device to be controlled.

With the abutment 52 between the main lever 28 and the secondary lever 54 in the position shown to the left of the pivot 30 for the lever 28 the action of the thermostat will be "direct acting" which means that as the pressure in the bellows 25 increases as a result of a temperature increase, the pressure supplied to the branch line will increase. This may be explained as follows: When the temperature responsive bellows 25 is satisfied the primary lever 28 and secondary lever 54 will hold the valve actuating member 65 in normal position at which time both the supply and exhaust valves 70 and 67 will be closed. On an increase in temperature the bellows 25 will expand and rotate the primary lever 28 in a counter-clockwise direction. The secondary lever 54 will be moved clockwise by the primary lever through the abutment 52 to force the adjustable connection 58 to the valve mechanism 56 downwardly. This will result in the ball 63 opening the inlet port by permitting the ball 70 to rise from its seat slightly. The pressure within the chamber formed by the upper and lower portions 59 and 82 of the valve 56 will rise and this increase in pressure will be supplied to the underside of the diaphragm 60 tending to rotate the secondary lever 54 in a counter-clockwise direction and the main lever 28 in a clockwise direction. When the pressure beneath diaphragm 60 is sufficient to balance the difference between the force of bellows 25 and that of the main spring 35, the adjustable connection 58 will move the ball 63 upwarly an amount sufficient to reseat the ball 70 thus closing the inlet port. Again starting from the normal position of the thermostat 25 and assuming a decrease in temperature, the bellows will contract and the main lever 28 will be rotated slightly in a clockwise direction and the secondary lever 54 will be permitted to rotate slightly in a counter-clockwise direction. This will reduce the force transmitted to the member 65 through the ball 63 and the adjustable connection 58 and the pressure under the diaphragm 60 will permit the member 65 to pivot about the under side of the head of the screw 78 and the ball 70 thus opening the exhaust port. The ball 67 controlling the exhaust port will bleed pressure from the space beneath the diaphragm 60 reducing the force acting upwardly on the adjustable connection 58. As this force is reduced the secondary lever 54 will rotate slightly in a clockwise direction and the force on the abutment 52 will be relieved permitting the bellows 25 to move the lever 28 back to its normal position. It will be understood that in the normal position of the device the force due to the bellows 25, the force of the spring 35, and the force due to the pressure under the diaphragm 60 in the valve mechanism 56 are in balance.

As pointed out heretofore the abutment 52 is adjustable throughout the length of the portions 31 and 33 of lever 28 which are parallel to the secondary lever 54, and in the operation of the thermostat described above the abutment 52 was assumed to be to the left of the pivot 30 for the main lever 28. If the abutment 52 is now moved to the portion 31 of the lever 28 to the right of the pivot 30 the thermostat will be of the "reverse acting" type. In this position of the abutment 52 it will be seen that the pressure beneath the diaphragm 60 in the valve mechanism 56 will be exerted through the secondary lever 54 and the main lever 28 to assist rather than oppose the force of the bellows 25. Thus on an increase in temperature the bellows 25 will rotate the main lever 28 in a counter-clockwise direction and the secondary lever 54 will also be rotated in a counter-clockwise direction. Assuming the valve 56 to be in normal position with both inlet and exhaust ports closed, this decrease in force on the adjustable connection 58 will serve to open the exhaust port to relieve the pressure beneath the diaphragm 60. This will again cause the secondary lever 54 to rotate in a clockwise direction. The upward force on the right hand end of the main lever 28 will be relieved slightly and the spring 35 will collapse the bellows 25 to its normal position. If the temperature of bellows 25 is reduced the main lever 28 will be rotated slightly in a clockwise direction and the secondary lever 54 will be forced downwardly to open the inlet port of the valve 56. This will result in an increase in pressure beneath the diaphragm 60 to increase the upward force on the secondary lever 54. Likewise there will be present a force tending to rotate the main lever 28 counter-clockwise to assist the bellows 25 in returning the valve to its normal position.

The differential adjustment of the device will be described assuming the abutment 52 between the main and secondary levers to be to the left of the pivot 30 to cause the device to be direct acting. It will be understood that a similar adjustment may be had when the thermostat is set up to be reverse acting. By differential is meant the change in temperature at the bellows 25 necessary to vary the pressure beneath the diaphragm 60, and therefore the branch line pressure, between the maximum and minimum values which will operate whatever control device is connected to the branch line from one extreme position to the other. The control device may be a steam valve operable from wide open to closed positions. It is common practice to supply compressed air at 15 pounds per square inch to a thermostat which varies the pressure in the branch line between zero and supply line pressure, and to provide a control device movable through its entire range on a change in pressure in the branch line from 3 pounds per square inch to 13 pounds per square inch. With the abutment 52 in the position shown the differential of the thermostat will be relatively small while if the abutment 52 is moved further to the left the differential will be increased. At zero branch line pressure the temperature responsive bellows 25 is substantially balanced by the spring 35 and no force is transmitted to the diaphragm 60 other than that necessary to balance the effect of the spring 76. In order to maintain any particular branch line pressure greater than zero a certain force must be exerted downwardly on the diaphragm 60 to balance the pressure beneath diaphragm 60. The counter-clockwise force acting on lever 28 necessary to produce this force at the diaphragm 60 will depend, therefore, on the position of the abutment 52. As the abutment 52 is moved farther to the left the leverage of bellows 25 on the diaphragm 60 will be reduced and consequently a greater increase in bellows temperature and pressure will be required to supply the force necessary to balance the branch line pressure. In other words, with the abutment 52 positioned far from the pivot 30 for the lever 28 a greater temperature change is necessary to cause the same to change in force on the diaphragm 60 than when the abutment 52 is positioned near the pivot 30.

The thermostat as shown in Figures 1, 2, and 3 is of the day-night type. The temperatures selected and indicated on the indicia represent the daytime setting. The night temperature setting will be at a value somewhat below this value. A supplementary bellows 90 is mounted in the bottom portion of the frame 21 as seen in Figure 2 and is normally supplied with air under pressure to compress a spring 92 which acts through an abutment 93 to pull downwardly on a lever 95 through a connection 96 as seen in Figures 2 and 3. The lever 95 is pivoted on a bracket supported by the portion 24 of the frame 21 and normally lies in the same plane as the secondary lever 54. An adjustable connection 97 mounted in the main lever 28 is adapted to transmit clockwise movements of the lever 95 to the main lever 28. It will be seen therefore that with the supplementary bellows 90 in its expanded position the spring 92 will be compressed and no force can be transmitted from the spring 92 to the lever 95 or to the main lever 28. When the pressure within the bellows 90 is relieved the spring 92 forces the abutment 93 downwardly and the force is transmitted through the member 96 and tends to cause clockwise rotation of the lever 95. This force is in turn transmitted through the member 97 to the main lever 28 and tends to oppose the force of the main calibrating spring 35. The net result is the same as reduction in the tension of the spring 35 by adjustment of the temperature setting mechanism and the thermostat will control at a lower temperature. As was indicated above, the connection 97 between the main lever 28 and the lever 95 is adjustable. A slot 100 as seen in Figure 3 is provided in the main lever 28 for movement of the connection 97 lengthwise of the lever 28. A corresponding slot is provided in the lever 95. As the connection 97 is moved to the left the spring 92 will have a greater leverage on the main lever 28 and the reduction in the control point of the thermostat will be greater than when the connection 97 is toward the right hand end of the slot 100.

Also mounted in the under part of the frame 21 is a day-night relay mechanism 102, see Figure 2, which is shown in cross section in Figure 6. This relay mechanism 102 is connected by a pipe 103 to the inlet port of the main valve mechanism 56 to provide pressure within the relay depending on the air supply pressure. A pipe 104 leads from the relay mechanism 102 to the bellows 90. The function of the day-night relay mechanism is to change the pressure within the bellows 90 from atmospheric pressure to supply line pressure on a small change in supply line pressure. Referring to Figure 6 the relay mechanism 102 comprises a base 105 and a cover 107 screw threaded thereto. Supply line air pressure is supplied to a chamber 108 intermediate the base 105 for the cover 107. Mounted within the base 105 is a diaphragm 110 which is subject to supply line pressure on its right hand side and to atmospheric pressure on its left hand side. A spring 112 which biases the diaphragm 110 toward the right is retained at its left hand end by a plate 114 which is adjustably screw threaded into the base 105. By adjusting the plate 114 in the base 105 the tension of the spring 112 may be varied and therefore the pressure within the chamber 108 necessary to force the diaphragm 110 toward the left may be adjusted. The connection 104 which leads to the bellows 90 is provided with two ports 116 and 117 within the base 105. The port 116 is closed by a spring strip 119 which is mounted on the base 105. The port 117 is likewise closed by a spring strip 121 mounted on the base 105 but within the chamber 108. Both spring strips 119 and 121 are biased to close their respective ports. Secured to the diaphragm 110 is an abutment 123 which is adapted to force the spring strip 121 to the right to open the port 117 when the pressure within the chamber 108 is at a relatively low value. Screw 125 is adjustably secured to the diaphragm 110 and serves to move the blade 119 to the left to open the port 116 when the pressure within the chamber 108 is at a relatively high value. Normally the screw 125 is so adjusted that the blade 119 will not open the port 116 until the blade 121 has closed the port 117. Normally the relay mechanism is so adjusted that when the pressure in the supply line is at 13 lbs. per square inch the diaphragm 110 is moved to the right by the spring 112 to open the port 117 and close port 116 and supply the full 13 pounds pressure to the bellows 90. This is the normal daytime pressure in the supply line. At night the supply line pressure is raised to 17 lbs. per square inch and the diaphragm 110 is forced to the left to close the port 117 and open the port 116. This exhausts the pressure within the bellows 90 and places the thermostat on its night setting by allowing the spring 92 to exert its force in a counter-clockwise direction on the main lever 28 of the thermostat. In practice the relay mechanism is adjusted to supply line pressure to the bellows 90 or exhaust the bellows 90 on a change in supply line pressure of 1 pound per square inch.

As seen in Figures 1, 2, and 3 a shaft 130 is pivoted in a bracket 131 which is secured to the extension 24 of the frame 21. The purpose of this shaft is to enable the thermostat to be placed on the daytime setting when the branch line pressure has been adjusted to the night value. The shaft 130 extends outside the cover 10 and is provided with handle 134 on its outer end. By rotating the handle 134 in a clockwise direction from the position shown in Figure 2 a screw 136 extending through the shaft 130 will force an upstanding portion 138 of the lever 95 to the left. This will cause the lever 95 to rotate in a counter-clockwise direction to tension the spring 92 and relieve the downward force of the lever 95 on the connection 97 and therefore relieve the main lever 28 of the force exerted by the spring 92. It will be seen that this operation of the handle 134 is effective to return the thermostat to its day setting. The limits of rotation of the shaft 130 are determined by the ends of the handle 134 striking against the wall plate. If the thermostat is on day setting the handle 134 may be rotated but it will have no effect on the thermostat operation. A spring 144 which is secured to the portion 24 of the frame 21 at one of its ends and to the shaft 130 at its other end biases the shaft 130 in a counter-clockwise direction and serves to return the shaft 130 to the position shown when the bellows 90 is supplied with air under pressure. If the thermostat is calling for night setting, and the handle 134 is rotated in a clockwise direction, it will remain there and cause the thermostat to operate at day temperatures. As soon as the daytime pressure is applied to the thermostat, the spring 144 will rotate the shaft back to its normal position, and the next night set-down will occur in its normal manner.

The bracket 131 is provided with a screw 140 which is adapted to cooperate with a pin 141 extending at right angles to the shaft 130. If it is desired to maintain the thermostat at its day setting regardless of main line pressure, the screw 140 is screwed inwardly while the shaft 130 is in the position which renders the spring 92 inoperative to depress the temperature setting. The thermostat is thereby locked in the day setting. This feature is desired in some applications where one or more rooms are occupied during the evening, while the rest of the building is maintained at a lower temperature. The thermostats in these rooms can thus be set to maintain day temperatures all the time.

The modification of the thermostat shown in Figure 7 is of the type known in the art as a "sub-master" thermostat. In such a thermostat the control point is varied by the variations in pressure caused by a "master" thermostat. The construction of this thermostat is similar in most respects to the day-night thermostat described above except that the auxiliary bellows is adapted to force the lever 95a in an upwardly direction and to force the main lever 28a in a clockwise direction through the connection 97a to assist the calibrating spring rather than to oppose it. Likewise the pressure in the auxiliary bellows is changed gradually over its entire range by a master thermostat rather than by changes in supply line pressure. Thus it will be seen that on increases in pressure in the auxiliary bellows the main lever 28a will be forced in clockwise direction to increase the control point of the instrument. Similarly reductions in pressure in the auxiliary bellows will relieve the force on the main lever 28a opposing the temperature responsive bellows and result in the thermostat controlling at a lower temperature.

While the foregoing description represents the preferred form of the invention at the present time, it will be understood that various modifications could be devised by those skilled in the art, which modifications would come within the spirit of the invention. I am, therefore to be limited only by the scope of the appended claims.

I claim as my invention:

1. In a fluid pressure control device, in combination, a valve mechanism, a first pivoted lever adapted to operate said valve mechanism, a second lever parallel to said first lever and pivoted on an axis substantially in the plane of said first lever and intermediate the pivot of said first lever and the point at which said first lever engages said valve mechanism, force transmitting means adjustable lengthwise of said levers for relatively positioning said two levers, a member movable with and extending substantially at right angles to said second lever and in line with the pivot therefor, and a condition responsive device and a spring operating on said member substantially on a line parallel to said levers.

2. In a condition responsive device, in combination, a base, a control mechanism, a lever pivoted in said base for operating said control mechanism, a condition responsive element mounted on said base tending to rotate said lever in one direction, a spring tending to rotate said lever in the opposite direction, indicia fixed with respect to said base, a screw having a bearing in said base, means for manually turning said screw with respect to said base, a member screw threaded internally to form a nut cooperating with said screw and further screw threaded externally, said member also having a first portion adapted to cooperate with a portion of said base to prevent rotation of said member and having a second portion cooperating with said indicia, and a nut cooperating with the externally threaded portion of said member and forming an abutment for said spring for adjusting the tension of said spring so that said condition responsive element will actuate said control mechanism at the value of the condition indicated by said member on said indicia.

3. In a condition responsive device, in combination, a base, a condition responsive element mounted on said base, a control element adapted to be operated by said condition responsive element, adjusting means for varying the value of the condition at which said condition responsive element actuates said control element, indicia on a portion of said base calibrated in values of the condition to be controlled, an indicator movable by said adjusting means for cooperating with said indicia to indicate the control point of the device, a cover for said condition responsive element and said indicia adapted to be secured to said base, and a supplementary set of indicia on said cover adapted when the cover is in place on said base to cooperate with said indicator to indicate the control point of the device.

4. In a fluid pressure control device, in combination, a base, a valve mechanism, a lever pivoted in said base for operating said valve mechanism, a condition responsive element mounted on said base tending to rotate said lever in one direction, a main spring tending to rotate said lever in the opposite direction, a supplementary spring, a mechanical connection between said supplementary spring and said lever, and pressure controlled means for rendering said mechanical connection ineffective to transmit the force of said supplementary spring to said lever.

5. In a fluid pressure control device, in combination, a base, a valve mechanism, a lever pivoted in said base for operating said valve mechanism, a condition responsive element mounted on said base tending to rotate said lever in one direction, a main spring tending to rotate said lever in the opposite direction, a supplementary spring normally tending to rotate said lever, and pressure controlled means for tensioning said supplementary spring thereby relieving said lever of the effect of said supplementary spring.

6. In a fluid pressure control device, in combination, a base, a valve mechanism, a lever pivoted in said base for operating said valve mechanism, a condition responsive element mounted on said base tending to rotate said lever in one direction, a main spring tending to rotate said lever in the opposite direction, a supplementary spring, a mechanical connection between said supplementary spring and said lever, means for manually adjusting the leverage of said mechanical connection, and pressure controlled means for rendering said mechanical connection ineffective to transmit the force of said supplementary spring to said lever.

7. In a fluid pressure control device, in combination, a chamber adapted to be supplied with a fluid under pressure, an outlet passage leading from said chamber, a first valve for closing said outlet passage, an exhaust passage for reducing the pressure in said outlet passage, a second valve for closing said exhaust passage, and means responsive to the fluid pressure within said chamber for opening said first valve on relatively low pressure and for opening said second valve on relatively high pressure whereby the pressure in said outlet passage will vary between atmospheric pressure and the pressure in said chamber depending on the pressure in said chamber.

8. In a fluid pressure control device, in combination, a chamber adapted to be supplied with a fluid under pressure, an outlet passage leading from said chamber, a first valve located within said chamber for closing said outlet passage, an exhaust passage for reducing the pressure in said outlet passage, an exhaust passage for reducing the pressure in said outlet passage, a second valve for closing said exhaust passage, a diaphragm subjected to atmospheric pressure on one side and the pressure within said chamber on the opposite side, a spring biasing said diaphragm in a direction tending to open said first valve, and means associated with said diaphragm for closing said first valve and opening said second valve to decrease the pressure in said outlet passage upon an increase in the pressure within said chamber.

9. In a fluid pressure control device, in combination, a base, a valve mechanism mounted on said base, a lever pivoted in said base for operating said valve mechanism, a condition responsive element mounted on said base tending to rotate said lever in one direction with a force proportional to the value of the condition, a spring tending to rotate said lever in the opposite direction, pressure controlled means, and means including a mechanical linkage between said pressure controlled means and said lever for placing a biasing force on said lever and hence varying the rotation thereof by said condition responsive element to change the control point thereof upon a change of pressure in said pressure controlled means.

10. In a fluid pressure control device, in combination, a base, a valve mechanism, a first lever pivoted in said base for operating said valve mechanism, a second lever parallel to said first lever and pivoted in said base at a point intermediate the pivot for said first lever and the point of contact between said first lever and said valve mechanism, force transmitting means in engagement with said first and second levers, said transmitting means being adjustable lengthwise of said levers, a condition responsive device operatively connected to said second lever tending to rotate said lever in one direction with a force depending on the value of the condition, a spring opposing rotation of said second lever by said condition responsive means, a third pivoted lever substantially parallel to said second lever, an abutment adapted to transmit force between said third and second levers, and an expansible pressure chamber in operative engagement with said third lever whereby changes in pressure within said expansible chamber will vary the control point of the device.

11. In a fluid pressure control device, in combination, a base, a valve mechanism, a first lever pivoted in said base for operating said valve mechanism, a second lever parallel to said first lever and pivoted in said base at a point intermediate the pivot for said first lever and the point of contact between said first lever and said valve mechanism, force transmitting means in engagement with said first and second levers, said transmitting means being adjustable lengthwise of said levers, a condition responsive device operatively connected to said second lever tending to rotate said lever in one direction with a force depending on the value of the condition, a spring opposing rotation of said second lever by said condition responsive means, a third pivoted lever substantially parallel to said second lever and pivoted at a point spaced along said third and second levers from the pivot for said second lever, an abutment adjustable lengthwise of said second and third levers adapted to transmit force between said third and second levers, and an expansible pressure chamber in operative engagement with said third lever whereby changes in pressure within said expansible chamber will vary the control point of the device.

12. In a fluid pressure control device, in combination, a base, a valve mechanism mounted on said base and interconnecting a source of pressure and a branch line for controlling the pressure in the branch line, a lever pivoted in said base for operating said valve mechanism, a condition responsive element mounted on said base tending to rotate said lever in one direction with a force proportional to the value of the condition, a spring tending to rotate said lever in the opposite direction, pressure controlled means, means for controlling the supply of pressure to said pressure controlled means in response to a predetermined fluid supply pressure, and means including a mechanical linkage between said pressure controlled means and said lever for placing a biasing force on said lever and hence varying the rotation thereof by said condition responsive element to change the control point thereof upon a change in pressure in said pressure controlled means.

13. In a fluid pressure control device, in combination, a base, a valve mechanism, a first lever pivoted in said base for operating said valve mechanism, a second lever parallel to said first lever and pivoted in said base at a point intermediate the pivot for said first lever and the point of contact between said first lever and said valve mechanism, force transmitting means in engagement with said first and second levers, said transmitting means being adjustable lengthwise of said levers, a condition responsive device operatively connected to said second lever tending to rotate said lever in one direction with a force depending on the value of the condition, a spring opposing rotation of said second lever by said condition responsive means, a third pivoted lever substantially parallel to said second lever, an abutment adapted to transmit force between said third and second levers, an expansible pressure chamber in operative engagement with said third lever whereby changes in pressure within said expansible chamber will vary the control point of the device, and means for controlling the supply of pressure to said pressure chamber in response to a predetermined fluid supply pressure.

14. In a fluid pressure control device, in combination, a base, a valve mechanism, a first lever pivoted in said base for operating said valve mechanism, a second lever parallel to said first lever and pivoted in said base at a point intermediate the pivot for said first lever and the point of contact between said first lever and said valve mechanism, force transmitting means in engagement with said first and second levers, said transmitting means being adjustable lengthwise of said levers, a condition responsive device operatively connected to said second lever tending to rotate said lever in one direction with a force depending on the value of the condition, a spring opposing rotation of said second lever by said condition responsive means, a third pivoted lever substantially parallel to said second lever, an abutment adapted to transmit force between said third and second levers, an expansible pressure chamber in operative engagement with said third lever whereby changes in pressure within said expansible chamber will vary the control point of the device, valve means for controlling the pressure applied to said pressure chamber, and diaphragm means responsive to fluid supply pressure for positioning said valve means.

15. In a fluid pressure control device, in combination, a base, a valve mechanism mounted on said base, a valve operating member operatively connected to said valve mechanism, a condition responsive element mounted on said base and tending to move said member to operate said valve mechanism in a first direction with a force proportional to the value of the condition, a main spring tending to cause motion of said member in the opposite direction, a supplementary spring, a mechanical connection between said supplementary spring and said member, and pressure controlled means for rendering said mechanical connection ineffective to transmit the force of said supplementary spring to said member.

16. In a fluid pressure control device, in combination, a base, a valve mechanism mounted on said base, a valve operating member operatively connected to said valve mechanism, a condition responsive element mounted on said base and tending to move said member to operate said valve mechanism in a first direction with a force proportional to the value of the condition, a main spring tending to cause motion of said member in the opposite direction, a supplementary spring, a mechanical connection between said supplementary spring and said member, pressure controlled means for rendering said mechanical connection ineffective to transmit the force of said supplementary spring to said member, and manually operable means for rendering said mechanical connection ineffective to transmit the force of said supplementary spring to said member.

17. In a fluid pressure control device, in combination, a base, a valve mechanism, a lever pivoted in said base for operating said valve mechanism, a condition responsive element mounted on said base tending to rotate said lever in one direction, a main spring tending to rotate said lever in the opposite direction, a supplementary spring, a mechanical connection between said supplementary spring and said lever, pressure controlled means for rendering said mechanical connection ineffective to transmit the force of said supplementary spring to said lever, and manually controlled means for rendering said mechanical connection ineffective to transmit the force of said supplementary spring to said lever.

18. In a fluid pressure control device, in combination, a base, a valve mechanism mounted on said base, a valve operating member operatively connected to said valve mechanism, a condition responsive element mounted on said base and tending to move said member to operate said valve mechanism in a first direction with a force proportional to the value of the condition, a main spring tending to cause motion of said member in the opposite direction, a supplementary spring, a mechanical connection between said supplementary spring and said member, a manually operable cam movable from a normal position to an operative position for moving said mechanical connection to a predetermined inoperative position and thereby rendering said connection ineffective to transmit force from said supplementary spring to said member, biasing means for biasing said cam to normal position, said cam being frictionally held in operative position by said supplementary spring acting through said mechanical connection, and pressure controlled means for rendering said connection ineffective to transmit force from said supplementary spring to said member, said pressure controlled means moving said connection to a greater extent than it is moved by said cam, whereby said cam is released and moved to its normal position by said biasing means.

FREDERICK D. JOESTING.

CERTIFICATE OF CORRECTION.

Patent No. 2,326,226. August 10, 1943.

FREDERICK D. JOESTING.

It is hereby certified that error appears in the printed specification of the above numbered patent requiring correction as follows: Page 6, first column, lines 10 and 11, claim 8, after "passage," strike out "an exhaust passage for reducing the pressure in said outlet passage," and that the said Letters Patent should be read with this correction therein that the same may conform to the record of the case in the Patent Office.

Signed and sealed this 12th day of October, A. D. 1943.

(Seal)

Henry Van Arsdale,
Acting Commissioner of Patents.